(12) United States Patent
Riaño Gutierrez

(10) Patent No.: US 8,485,220 B2
(45) Date of Patent: Jul. 16, 2013

(54) AUTOMATIC FLOW REGULATOR VALVE

(76) Inventor: Ismael Hernan Riaño Gutierrez, Medellin (CO)

( * ) Notice: Subject to any disclaimer, the term of this patent is extended or adjusted under 35 U.S.C. 154(b) by 478 days.

(21) Appl. No.: 12/906,483

(22) Filed: Oct. 18, 2010

(65) Prior Publication Data

US 2011/0284104 A1    Nov. 24, 2011

(30) Foreign Application Priority Data

May 24, 2010 (CO) ................................. 10-061777

(51) Int. Cl.
| F16K 15/00 | (2006.01) |
| F16K 17/00 | (2006.01) |
| F16K 21/04 | (2006.01) |
| F16L 55/04 | (2006.01) |

(52) U.S. Cl.
USPC ........................... 137/517; 137/513.3; 138/31

(58) Field of Classification Search
USPC ........... 138/26, 31; 137/513.3, 517, 518–521, 137/550; 251/127
See application file for complete search history.

(56) References Cited

U.S. PATENT DOCUMENTS

| 371,063 | A | * | 10/1887 | Hays ............................. 137/503 |
| 2,646,078 | A | * | 7/1953 | Adams ........................... 138/43 |
| 2,886,054 | A | * | 5/1959 | Smith ........................... 137/316 |
| 3,343,563 | A | * | 9/1967 | Carter, Jr. .................... 137/517 |
| 3,638,675 | A | * | 2/1972 | Dockery ....................... 137/550 |
| 3,752,182 | A | * | 8/1973 | Brand .......................... 137/504 |
| 3,877,489 | A | * | 4/1975 | Louie et al. ................... 138/46 |
| 3,938,547 | A | * | 2/1976 | Jones ........................... 137/488 |
| 3,973,580 | A |   | 8/1976 | Ueda |
| 3,990,420 | A | * | 11/1976 | Bitterman et al. ........... 123/587 |
| 4,896,696 | A |   | 1/1990 | Bradley et al. |
| 4,932,435 | A |   | 6/1990 | Stroze et al. |
| 4,964,611 | A |   | 10/1990 | Andersson |
| 5,509,407 | A |   | 4/1996 | Schuler |
| 5,511,582 | A |   | 4/1996 | Hudson |
| 6,129,112 | A |   | 10/2000 | Huthmann et al. |
| 7,156,120 | B2 | * | 1/2007 | Cherfane et al. ............. 137/504 |
| 7,503,341 | B1 |   | 3/2009 | Achterman |
| 7,552,743 | B1 |   | 6/2009 | Achterman |
| 7,591,282 | B1 |   | 9/2009 | Achterman |
| 7,644,726 | B1 |   | 1/2010 | Achterman |
| 7,681,597 | B2 | * | 3/2010 | Knapp ........................... 138/31 |
| 7,681,598 | B2 | * | 3/2010 | Knapp ........................... 138/31 |
| 7,726,344 | B2 |   | 6/2010 | Knapp |
| 2008/0083463 | A1 |   | 4/2008 | Fazekas et al. |
| 2008/0277612 | A1 |   | 11/2008 | Jacobs et al. |

* cited by examiner

*Primary Examiner* — John Rivell
*Assistant Examiner* — Seth W MacKay-Smith
(74) *Attorney, Agent, or Firm* — Albert Bordas, P.A.

(57) ABSTRACT

An automatic flow regulator valve designed to regulate water pressure from a liquid source outlet in the event of pressure surges and/or fluctuations. In an "open" position, the predetermined water flow pressures are not sufficient to overcome a spring force of a spring. Therefore, a sealing plate is maintained separated from a step by the spring force, thus allowing water to flow around the outmost perimeter edge of sealing plate. In operation under water flow pressure surges and/or fluctuations, the automatic flow regulator valve is "closed". In the "closed" position, the water flow pressure surges and/or fluctuation pressures are sufficient to overcome the spring force of spring. Therefore, the sealing plate is biased against the step and the water does not flow around the outmost perimeter edge of sealing plate since sealing plate is biased against the step.

18 Claims, 4 Drawing Sheets

AUTOMATIC FLOW REGULATOR VALVE

BACKGROUND OF THE INVENTION

1. Field of the Invention

The present invention relates to valves, and more particularly, to an automatic flow regulator valve.

2. Other Related Applications

The present application claims priority of Colombian Patent Application No. 10-061777, filed on May 24, 2010, which is hereby incorporated by reference.

3. Description of the Related Art

Applicant believes that one of the closest references corresponds to U.S. Patent Application Publication No. 2008/0277612, published on Nov. 13, 2008 to Jacobs, et al. for a pressure compensating flush valve with self-cleaning piston. However, it differs from the present invention because Jacobs, et al. teach a flush valve that includes a pressure-compensating device for toilet and urinals to ensure consistent flush and bowl refill volumes. Certain flush volume limits may require for compliance with federal, state and local regulations regarding water usage. The flush valve can adjust water flow rates within the prescribed water usage limits and does not sacrifice the toilet's bowl washing and waste removal capabilities.

Applicant believes that another reference corresponds to U.S. Patent Application Publication No. 2008/0083463, published on Apr. 10, 2008 to Fazekas, et al. for an automatic flow control regulator valve. However, it differs from the present invention because Fazekas, et al. teach a flow control valve having a body portion including a first end, a second end and an axially extending passageway. A metering valve is included that is axially moveable under the influence of fluid pressure from a rest position to a flow restricting position. In the flow restricting position, the metering valve can restrict the flow of fluid through the axially extending passageway. The metering valve includes an upstream portion and a downstream portion. The upstream portion has a flattened top spherical shape. A biasing device is provided that normally biases the metering valve in the rest position, and for provides resistance to movement of the metering valve to the flow restricting position.

Applicant believes that another reference corresponds to U.S. Pat. No. 7,726,344 issued to Knapp on Jun. 1, 2010 for a device for dynamic control of a water flow. However, it differs from the present invention because Knapp teaches a device for dynamic adjustment of a water flow, used to stabilize the operational mode of a thermostatic mixing tap. It includes a valve consisting of a piston and a return spring forcing the piston into a first position, said piston being displaced into two positions according to the flow. When the flow is lower than a threshold value, the piston is located in the first position and a flow-limited means limits the flow. When the flow exceeds the threshold value, the piston is displaced into the second position and the flow limiting means is obviated.

Applicant believes that another reference corresponds to U.S. Pat. No. 7,681,598 issued to Knapp on Mar. 23, 2010 for a device for dynamic control of a water flow. However, it differs from the present invention because Knapp teaches a device for dynamic control of a water flow, including the following items in a body: a feed chamber, a discharge chamber and a piston arranged between the feed chamber and the discharge chamber. The piston can be displaced from a first position, which is offset towards the feed chamber and wherein the piston narrows the flow between the feed chamber and the discharge chamber, and a second position, which is offset towards the discharge chamber and wherein the piston does not narrow the flow between the feed chamber and the discharge chamber.

Applicant believes that another reference corresponds to U.S. Pat. No. 7,681,597 issued to Knapp on Mar. 23, 2010 for a thermostatic mixer with device for dynamic regulation of a water flow. However, it differs from the present invention because Knapp teaches a thermostatic mixer, including a device for the dynamic regulation of cold-water flow, which supplies the mixer. A resistance is generated to the flow of cold water supplied to the thermostatic mixer when small flows of mixed water are required, and said resistance is lifted or reduced when large flows of mixed water are required. Said operation is automatically carried out by devices for dynamic regulation of flow, whereby the flow cross-section provided for the incoming cold water is reduced when the drawn flow is reduced and a larger flow cross-section reestablished when a larger flow is required.

Applicant believes that another reference corresponds to U.S. Pat. No. 7,644,726 issued to Achterman on Jan. 12, 2010 for a self-cleaning flow shut off valve. However, it differs from the present invention because Achterman teaches a flow shut off valve for residential water line pressure that includes a self cleaning valve element held in a housing having an inlet, an outlet section and an outlet adapter with a fluid passage connecting the inlet and the outlet adapter. The inlet and the outlet adapter include exterior threads for connection to a further item. The valve element is slidably mounted within a passage in a poppet guide and metering slot insert having one or more metering slots that allow variable fluid flow between the inlet and outlet adapter. A spring biases the valve element toward the inlet. Reduced backpressure at the outlet adapter drives the valve element into a closed position with a sealing surface against the valve seat to terminate flow. The flow shutoff valves are contemplated for integration with stop valves supplying water to employment with household appliances, sinks, toilets and the like.

Applicant believes that another reference corresponds to U.S. Pat. No. 7,591,282 issued to Achterman on Sep. 22, 2009 for a damped, self-cleaning flow shutoff valve and associated methods. However, it differs from the present invention because Achterman teaches a valve that comprises a housing defining a flow passage, an outer cylindrical wall, an inner cylindrical wall, and a valve seat. An annular cavity is formed between the outer cylindrical wall and the inner cylindrical wall. A valve member is slidably mounted within the housing. The valve member includes an annular skirt section extending in the downstream direction. A downstream-facing portion of the valve member comprises a sealing portion configured to selectively engage the valve seat. The valve member is movable between an upstream no flow position, a downstream shutoff position, and a normal flow position intermediate the no flow position and the shutoff position. A biasing element is disposed between the housing and the valve member so as to bias the valve member away from the valve seat. When the valve member moves from the normal flow position to the shutoff position, the annular skirt section penetrates the annular cavity and displaces water therefrom to dampen the downstream movement of the valve member.

Applicant believes that another reference corresponds to U.S. Pat. No. 7,552,743 issued to Achterman on Jun. 30, 2009 for a self-cleaning flow shutoff valve. However, it differs from the present invention because Achterman teaches a flow shut off valve for residential water line pressure that includes a housing having an inlet, an outlet and a passage there between with a valve seat in the passage. A valve element is slidably mounted within the passage and includes a cavity open to the inlet and orifices partially restricting flow from the cavity to the passage. A spring biases the valve element toward the inlet. Reduced backpressure at the outlet drives the valve element into a closed position with a sealing surface against the valve seat to terminate flow. The restrictive orifices in the valve element extend from the cavity to the periphery of the valve element and, in a position toward the inlet, the restrictive orifices are closed by the housing to block communication between the inlet and the outlet. In an intermediate position, the orifices are open and the sealing surface is not against the valve seat. A motion damper may be employed to allow for start-up conditions on sprinkler systems and the like. The flow shutoff valves are contemplated for employment with household appliances using water and sprinkler systems.

Applicant believes that another reference corresponds to U.S. Pat. No. 7,503,341 issued to Achterman on Mar. 17, 2009 for a self cleaning flow shutoff valve and associated methods. However, it differs from the present invention because Achterman teaches a flow shutoff valve that comprises a flow-metering sleeve positioned within a flow passage. The sleeve and a housing of the valve define an annular space. The sleeve includes a flow-metering aperture downstream of the annular space. A valve member is slidably mounted within the sleeve. The valve member is movable between a no flow position, a normal flow position and a shutoff position. The valve is self-cleaning, so that it reduces the buildup of sediment within the valve.

Applicant believes that another reference corresponds to U.S. Pat. No. 6,129,112 issued to Huthmann, et al. on Oct. 10, 2000 for flow regulator. However, it differs from the present invention because Huthmann, et al. teach a flow regulator that always guarantees the same rate of flow independently from the admission pressure. This is achieved by a piston (26), which is mounted movably in the direction of flow and is loaded by an elastic element (29) in the direction opposite the direction of flow, being arranged in a housing (10) of the flow regulator. An annular space around the piston (26) is reduced due to the movement of the piston (26) in the direction of the flow. This flow regulator has a strong throttling action in the case of high admission pressure and a weak throttling action in the case of low admission pressure, so that the rate of flow is always maintained at a constant value.

Applicant believes that another reference corresponds to U.S. Pat. No. 5,511,582 issued to Hudson on Apr. 30, 1996 for a compensating valve for control of fluid flow. However, it differs from the present invention because Hudson teaches a hydraulically operated adjustable valve for controlling fluid flow through an orifice directly responsive to changes in pressure monitored either upstream or downstream of the valve, suitable for use in high pressure regimes, where said valve is controlled by a piston having a main body, a shoulder and an extension, where hydraulic fluid within a hydraulic bore acts upon said extension to extend said piston, and where a biasing spring acts on the main body in combination with pressurized air within a lower air chamber air acting upon said shoulder to retract said piston. An apertured valve barrier allows the valve to compensate for pressure changes in a high-pressure regime upstream of the valve.

Applicant believes that another reference corresponds to U.S. Pat. No. 5,509,407 issued to Schuler on Apr. 23, 1996 for a first stage pressure regulator with flow around seat. However, it differs from the present invention because Schuler teaches a first stage pressure regulator for use with a high-pressure source of breathable gas that includes a housing and means for attaching the housing to a high-pressure source of breathable gas. A pressure-regulated outlet is provided and a valve seat member fixed within the housing includes a central seating surface perpendicularly disposed to a longitudinal axis of the valve seat member. The perimeter of the valve seat member is shaped to enable the breathable gas to pass parallel to the valve seat member longitudinal axis in order to enable the high-pressure source to be connected coaxially with the first stage pressure regulator. A piston is provided which includes a hollow center in fluid communication with the pressure-regulated outlet. An open end of the piston is provided for sealing the piston against the central seating surface of the valve seat, and a spring is provided for biasing the piston in order to affect a regulated valve opening between the piston open end and the valve seat member.

Applicant believes that another reference corresponds to U.S. Pat. No. 4,964,611 issued to Andersson on Oct. 23, 1990 for a valve for pressurized media. However, it differs from the present invention because Andersson teaches a valve for pressurized media which includes a valve housing provided with inlet and outlet and a movable main valve plug for infinitely variably controlling the pressurized medium flow through the valve with the aid of a pilot flow originating from the pressurized medium flow and passing through a variable throttling means situated in the main valve plug. For obtaining a compact valve unit, the pilot flow control valve (18) is arranged in a member arranged as a lid on a cartridge sleeve including the valve housing, for opening or closing a pilot flow duct (15) in the cartridge in response to a control signal, a pressure compensation means (54) being arranged in the duct (15) after the throttling means (26) in the main valve plug (5) but before the pilot flow control valve (18), this means (54) being under the action of the pressure in the pilot flow duct (15) prevailing after the throttling means (26) and of a piston sensing the pressure in the valve inlet and/or outlet for throttling or interrupting the pilot flow before the pilot flow control valve (18) in response to pressure changes in the inlet or outlet.

Applicant believes that another reference corresponds to U.S. Pat. No. 4,932,435 issued to Stroze, et al. on Jun. 12, 1990 for a multi-stage flow-regulating valve. However, it differs from the present invention because Stroze, et al. teach a multi-stage flow regulating valve (18) which includes a valve body (20, 22) having a fluid inlet (24) and a fluid outlet (26) defining a flow path (A,B) through the valve body. A first stage valve piston (30) is reciprocally mounted within a cylinder (28) in the valve body (20) in the flow path between the inlet and the outlet for restricting fluid flow in response to a first range of incoming fluid pressure. The first stage piston (30) has an inlet orifice (34) exposed to the incoming fluid and an outlet port (36) in registry with the outlet (26) of the valve body (20). A second stage valve piston (44) is reciprocally mounted within the first stage piston (30) and has an orifice plate (46) for covering the inlet orifice (34) of the first stage valve piston (30). The orifice plate has smaller orifices (48) for further restricting fluid flow through the valve body. The first stage piston is loaded by a spring (38) defining a first range of incoming fluid pressure and the reference pressure on the second stage valve piston defines a second range of incoming fluid pressure to provide a distinct multi-level range of regulating pressures.

Applicant believes that another reference corresponds to U.S. Pat. No. 4,896,696 issued to Bradley, et al. on Jan. 30, 1990 for flow control restrictor. However, it differs from the present invention because Bradley, et al. teach a restrictor for use in conduit systems, such as refrigeration and heat pump circuits for controlling the flow of fluid therein. The restrictor incorporates a unique shape to lower the operational noise normally generated by a restrictor without affecting the flow characteristics. Noise level is reduced by utilizing a specific configuration of the outer surfaces of the restrictor with respect to the direction of fluid flow.

Applicant believes that another reference corresponds to U.S. Pat. No. 3,973,580 issued to Ueda on Aug. 10, 1976 for a flow divider valve. However, it differs from the present invention because Ueda teaches a flow divider valve for controlling the fluid quantities to be independently supplied into a first, a second and a third hydraulic circuit from a fluid pressure source comprises a first and a second spool engaged slidably within a cylindrical bore of a casing coaxially to each other to form at their outer ends a first and a second pressure chamber respectively in communication with a first and a second outlet port provided on the casing and to form a third pressure chamber therebetween in open communication with an inlet port provided on the casing, the third pressure chamber being communicated with the first and second hydraulic circuits through a first and a second fixed orifice provided respectively between the third pressure chamber and the first and second outlet ports and annular throttles formed respectively between the first outlet port and the periphery of the first spool and between the second outlet port and the periphery of the second spool, and the first and second spools being biased inwardly to each other to engage the inner ends of the spools to each other to complete the third pressure chamber.

Applicant believes that another reference corresponds to U.S. Pat. No. 5,123,628 issued to Yu on Jun. 23, 1992 for a water saving valve. However, it differs from the present invention because Yu teaches a water saving valve for attachment between a water supply pipe and a showerhead. The water saving valve has a spool fitted in a bore defined by first and second walls having first and second openings, respectively. The first and second walls separate the bore from a pipe passageway and a showerhead passageway, respectively. A circumferentially recessed groove is provided in a central portion of the spool, the recessed groove defined by a core, which has a diameter approximately 80% of the diameter of the spool. The core has a valve passageway which, when the spool is fitted in the bore in a first portion, substantially horizontally aligns with the first and second openings to allow water to flow unrestricted therethrough. The spool may be rotated by a handle to different positions to regulate the quantity of water allowed to flow through the showerhead Other patents describing the closest subject matter provide for a number of more or less complicated features that fail to solve the problem in an efficient and economical way. None of these patents suggest the novel features of the present invention.

SUMMARY OF THE INVENTION

The present invention is an automatic flow regulator valve. In a preferred embodiment, the instant invention is designed to regulate water pressure from a liquid source outlet in the event of pressure surges and/or fluctuations. The liquid source outlet can be a water outlet, such as, but not limited to plumbing or pipes connecting to a sink, a dishwasher, a shower, a hose, an irrigation system, or other liquid source outlet.

It is therefore one of the main objects of the present invention to provide an automatic flow regulator valve that effectively and efficiently regulates fluid flow.

It is another object of this invention to provide an automatic flow regulator valve that controls fluid pressure fluctuations and/or variations.

It is another object of this invention to provide an automatic flow regulator valve that is automatic, preventing fluid spills.

It is another object of this invention to provide an automatic flow regulator valve that can be for domestic or industrial use.

It is another object of this invention to provide an automatic flow regulator valve that is installed at the fluid outlet point.

It is another object of this invention to provide an automatic flow regulator valve that can be installed to sinks, dishwashers, showers, hoses, irrigation systems, and other appliances or systems receiving fluids or water from a source.

It is another object of this invention to provide an automatic flow regulator valve that can be readily installed and removed without the need of any special tools and that is made of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
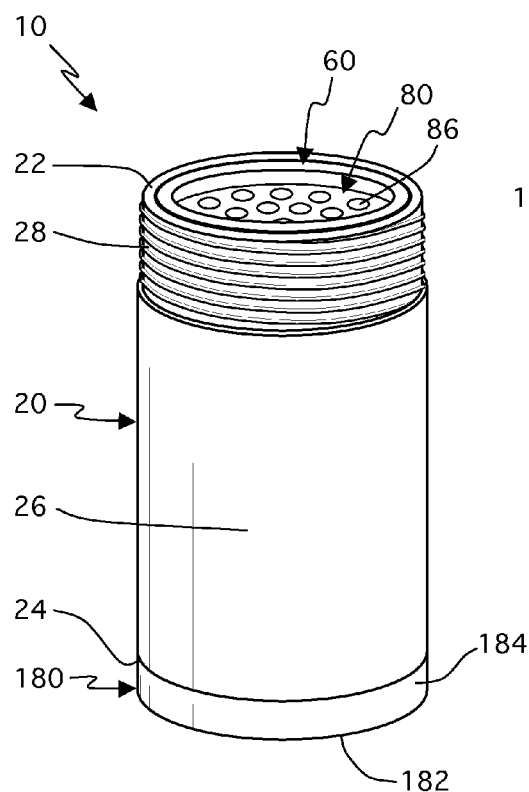
FIG. 1 is a first isometric view of the instant invention right side up.
Figure 2:
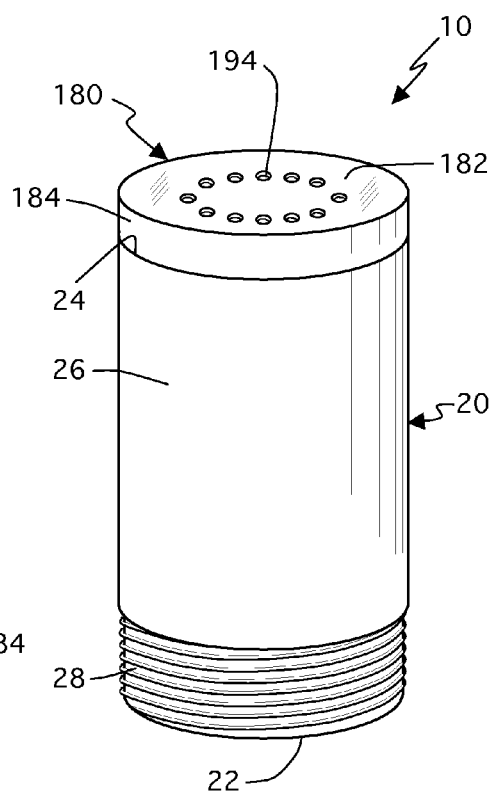
FIG. 2 is a second isometric view of the instant invention shown in FIG. 1 and upside-down.

Referring now to the drawings, the present invention is generally referred to with numeral 10 and is defined as an automatic flow regulator valve. In a preferred embodiment, instant invention 10 is designed to regulate water pressure from a liquid source outlet in the event of pressure surges and/or fluctuations. The liquid source outlet can be a water outlet, such as, but not limited to plumbing or pipes connecting to a sink, a dishwasher, a shower, a hose, an irrigation system, or other liquid source outlet. As seen in FIGS. 1 and 2, it can be observed that it basically includes housing assembly 20, locking ring 60, filter 80, and outlet member 180.

Figure 3:
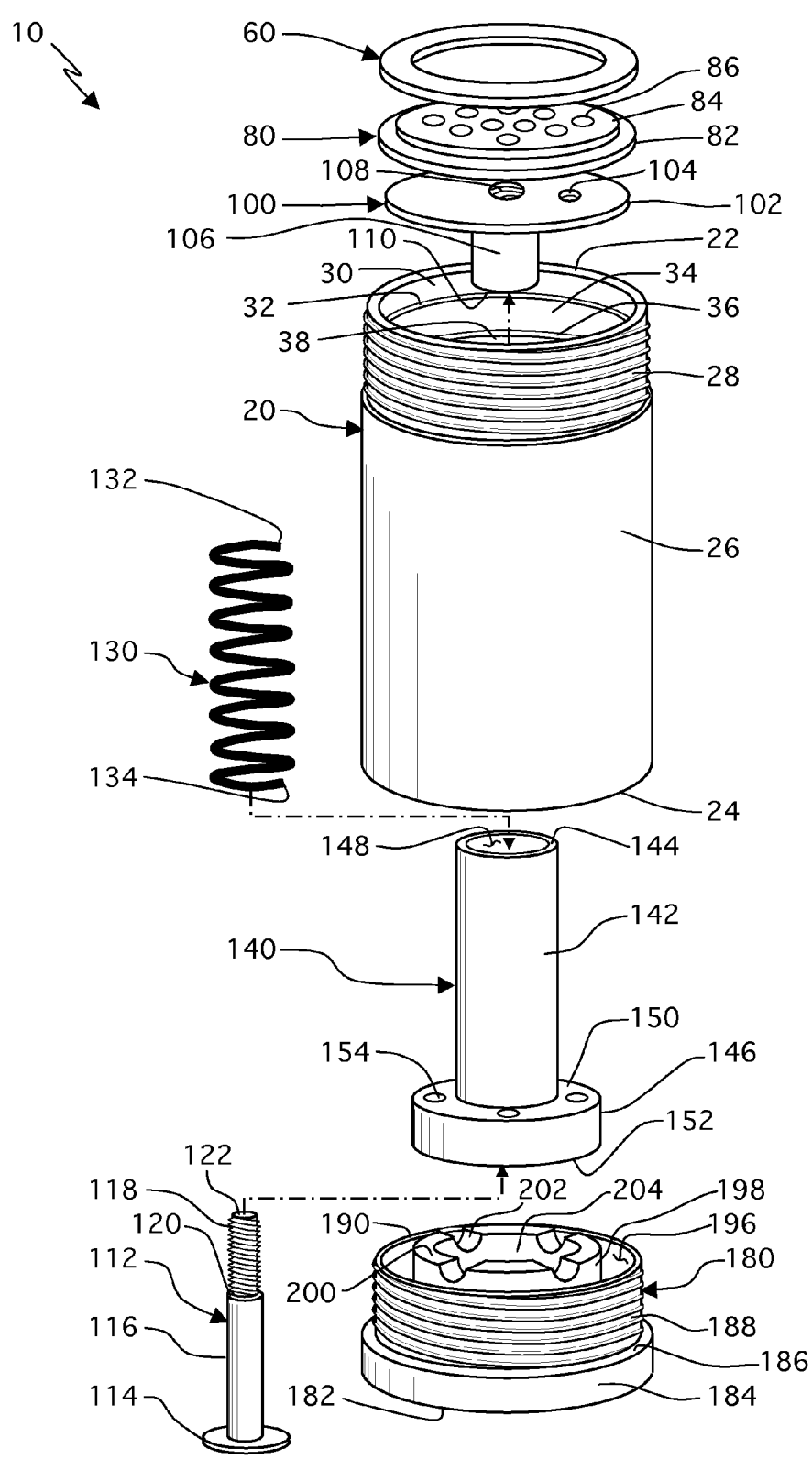
FIG. 3 is an exploded view of the instant invention shown in FIG. 1.

As seen in FIG. 3, housing assembly 20 comprises ends 22 and 24, and exterior wall 26 having exterior threaded section 28 that extends from end 22 without reaching end 24. Filter 80 comprises base 82, raised section 84, and holes 86. Piston assembly 100 comprises sealing plate 102 and neck 106. Sealing plate 102 comprises hole 104. Neck 106 comprises end 110. Sealing plate 102 and neck 106 have common central threaded hole 108. Bolt 112 comprises head 114, shank 116, and threaded portion 118 with end 122. Shank 116 comprises step 120. Spring 130 has ends 132 and 134. Spring 130 has a cooperative shape and dimension to fit within central cavity 148 of cylinder assembly 140. Cylinder assembly 140 comprises body 142 and base 146. Body 142 comprises end 144 and central cavity 148. Base 146 comprises top surface 150 and end 152. Base 146 further comprises holes 154. Outlet member 180 has end 182, base 184, threaded wall 188, and interior wall 198. Base 184 comprises lip 186.

Threaded wall 188 extends a first predetermined distance from lip 186, and interior wall 198 extends a second predetermined distance from base 184. The second predetermined distance is longer than the first predetermined distance. Threaded wall 188 has edge 190, and interior wall 198 has edge 200 with cutouts 202. Threaded wall 188 and interior wall 198 define intermediate cavity 196 and interior wall 198 defines internal cavity 204. Base 184 comprises through openings 194 arranged in intermediate cavity 196, as best seen in FIG. 2.

Figure 4:
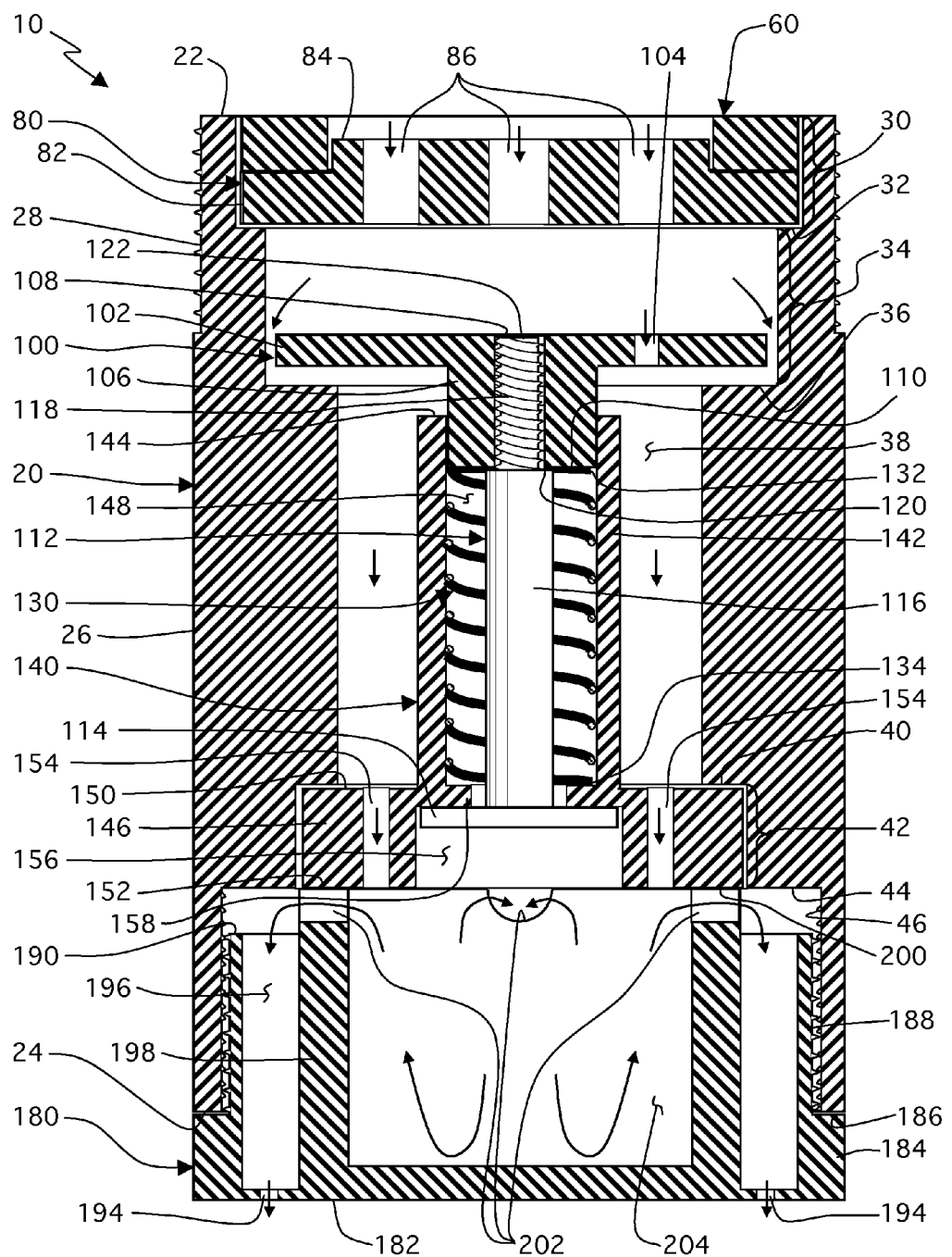
FIG. 4 is a cross-sectioned view of the invention when it is in an open position.
Figure 5:
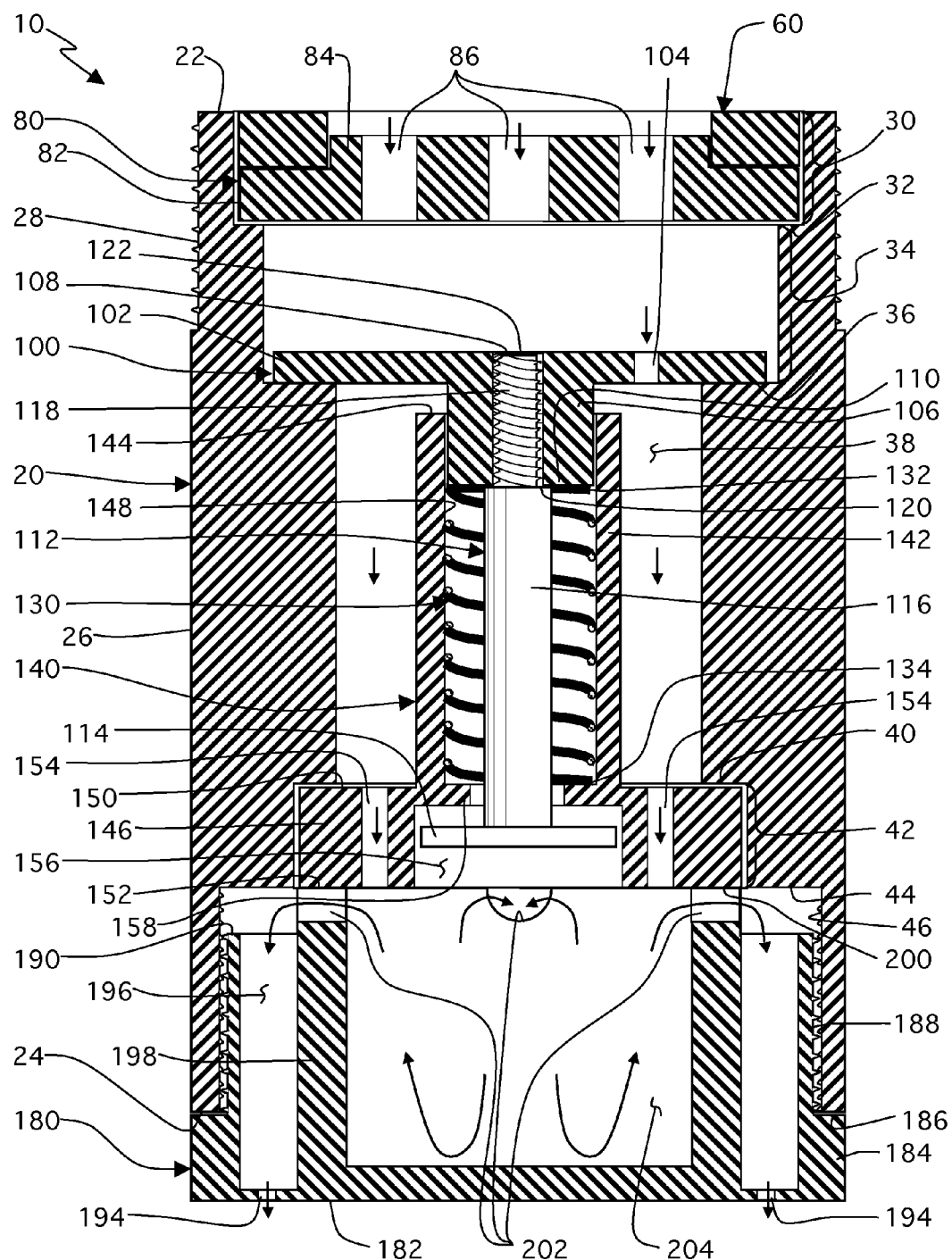
FIG. 5 is a cross-sectioned view of the invention when it is in a closed position.

As seen in FIGS. 4 and 5, extending internally from end 22, housing assembly 20 further comprises internal first, second, third, and fourth sections 30, 34, 38, and 42 respectively, defined by first, second, third, and fourth steps 32, 36, 40, and 44, respectively, and interior threaded section 46 adjacent to end 24. Filter 80 is removably mounted into first section 30 in way that base 82 rests on first step 32. Filter 80 locks in place with locking ring 60. Sealing plate 102 is cooperatively mounted in second section 34 and its movement towards end 24 is limited by second step 36. Threaded portion 118 of bolt 112 is removably mounted to central threaded hole 108 of piston assembly 100. Step 120 of shank 116 acts as stopper for threaded portion 118 inside central threaded hole 108. Base 146 further comprises central cavity 156 with neck 158. Central cavities 148 and 156 are connected. Central cavity 148 is smaller in diameter than central cavity 156. Neck 158 is disposed between central cavities 148 and 156. Central cavity 148 has a cooperative shape and dimension to receive spring 130 therein.

To assemble automatic flow regulator valve 10, spring 130 is housed inside central cavity 148. Cylinder assembly 140 is housed in third and fourth sections 38 and 42 respectively. Body 142 is housed in third section 38 and base 146 is housed in fourth section 42 with top surface 150 partially resting against third step 40. Piston assembly 100 is positioned within second and third sections 34 and 38, in a way that neck 106 is partially housed within body 142 and sealing plate is kept in second section 34 by second step 36. Hole 104 is aligned with third section 38. Bolt 112 is inserted through base 146 into body 142 with shank 116 and threaded portion 118 is housed within body 142, while head 114 is kept within base 146. Threaded portion 118 is threaded into central threaded hole 108 until step 120 biases against end 110. Outlet member 180 is then secured onto housing assembly 20. Edge 200 of interior wall 198 locks base 146 within fourth section 42, specifically, top surface 150 is kept against third step 40. In this way, holes 154 are aligned with internal cavity 204. Filter 80 is mounted into first section 30 and locking ring 60 is mounted over filter 80.

In a preferred embodiment, exterior threaded section 28 is mounted onto a liquid source outlet. The liquid source outlet can be a water outlet, such as, but not limited to plumbing or pipes connecting to a sink, a dishwasher, a shower, a hose, an irrigation system, or other liquid source outlet.

In operation under predetermined water flow pressures as seen in FIG. 4, automatic flow regulator valve 10 is "open". In the "open" position, the predetermined water flow pressures are not sufficient to overcome a spring force of spring 130. Therefore, piston assembly 100, and specifically sealing plate 102, is maintained separated from second step 36 by the spring force of spring 130. In the "open" configuration, water flows through holes 86 into second section 34. The water then flows around an outmost perimeter edge of sealing plate 102 and also through hole 104 to third section 38. The water then flows through holes 154 into central cavity 204. The water then flows through cutouts 202 and into intermediate cavity 196 to finally exit through holes 194.

In operation under water flow pressure surges and/or fluctuations as seen in FIG. 5, automatic flow regulator valve 10 is "closed". In the "closed" position, the water flow pressure surges and/or fluctuation pressures are sufficient to overcome the spring force of spring 130. Therefore, piston assembly 100, and specifically sealing plate 102, is biased against second step 36 by the spring force of spring 130. In the "closed" configuration, water flows through holes 86 into second section 34. However, the water does not flow around the outmost perimeter edge of sealing plate 102 since sealing plate 102 is biased against second step 36. Instead, water only flows through hole 104 to third section 38. The water then flows through holes 154 into central cavity 204. The water then flows through cutouts 202 and into intermediate cavity 196 to finally exit through holes 194.

Instant invention 10, therefore when installed onto a liquid source outlet, promotes limited water pressure therefrom, even in the event of pressure surges and/or fluctuations. Thus, promoting water savings by preventing wasted water in the event of surges and/or fluctuations, and a longer lifespan for the plumbing and/or pipes connected to the sink, dishwasher, shower, hose, irrigation system, and other appliances or gadgets receiving water flow from a liquid source outlet.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automatic flow regulator valve, comprising:
   A) a housing assembly comprising first and second ends, and an exterior wall having an exterior threaded section that extends from said first end towards said second end without reaching said second end, extending internally from said first end said housing assembly further comprises internal sections defined by first, second, third, and fourth steps, and an interior threaded section adjacent to said second end;
   B) a locking ring;
   C) a piston assembly comprising a sealing plate and a first neck;
   D) a bolt comprising a head, a shank and a threaded portion;
   E) a spring having third and fourth ends and having a spring force, in an open position first liquid flow pressures are not sufficient to overcome said spring force causing said sealing plate to maintain separate from said second step, whereby liquid flows around an outmost perimeter edge of said sealing plate;
   F) a cylinder assembly comprising a body and a first base; and
   G) an outlet member having a fifth end, said outlet member comprises a second base, a threaded wall, and an interior wall, said second base comprises a lip.

2. The automatic flow regulator valve set forth in claim 1, further characterized in that in a closed position, second liquid flow pressures greater than said first liquid flow pressures, are sufficient to overcome said spring force causing said sealing plate to bias against said second step, whereby liquid does not flow around said outmost perimeter edge of said sealing plate.

3. An automatic flow regulator valve, comprising:
   A) a housing assembly comprising first and second ends, an exterior wall having an exterior threaded section that extends from said first end towards said second end without reaching said second end, extending internally from said first end said housing assembly further comprises internal first, second, third, and fourth sections defined by first, second, third, and fourth steps, and an interior threaded section adjacent to said second end;

B) a locking ring;

C) a piston assembly comprising a sealing plate and a first neck;

D) a bolt comprising a head, a shank and a threaded portion;

E) a spring having third and fourth ends;

F) a cylinder assembly comprising a body and a first base; and

G) an outlet member having a fifth end, said outlet member comprises a second base, a threaded wall, and an interior wall, said second base comprises a lip.

4. The automatic flow regulator valve set forth in claim 3, further comprises a filter, said filter comprises a third base, a raised section, and first holes, said filter is removably mounted into said first section so that said third base rests on said first step, said filter is locked in place with said locking ring.

5. The automatic flow regulator valve set forth in claim 3, further characterized in that said sealing plate comprises a first hole, said sealing plate and said first neck have a common central threaded hole.

6. The automatic flow regulator valve set forth in claim 5, further characterized in that said sealing plate is cooperatively mounted in said second section and its movement towards said second end is limited by said second step.

7. The automatic flow regulator valve set forth in claim 6, further characterized in that said first neck comprises a sixth end.

8. The automatic flow regulator valve set forth in claim 7, further characterized in that said threaded portion is removably mounted to said central threaded hole, said shank comprises a fifth step that acts as a stopper for said threaded portion inside said central threaded hole, said threaded portion has a seventh end.

9. The automatic flow regulator valve set forth in claim 3, further characterized in that said body comprises a sixth end and a first central cavity, said first base comprises a top surface and a seventh end, said base further comprising first holes and a second central cavity with a second neck.

10. The automatic flow regulator valve set forth in claim 3, further characterized in that said threaded wall extends a first predetermined distance from said lip, and said interior wall extends a second predetermined distance from said base, said second predetermined distance is longer than said first predetermined distance.

11. The automatic flow regulator valve set forth in claim 10, further characterized in that said threaded wall has a first edge, and said interior wall has a second edge with at least one cutout.

12. The automatic flow regulator valve set forth in claim 11, further characterized in that said threaded wall and said interior wall define an intermediate cavity and said interior wall define an internal cavity, said second base comprises through openings arranged in said intermediate cavity.

13. The automatic flow regulator valve set forth in claim 12, further characterized in that said threaded wall has a cooperative shape and dimension to receive said interior threaded section.

14. The automatic flow regulator valve set forth in claim 9, further characterized in that said cylinder assembly is housed in said third and fourth sections, said body is housed in said third section and said base is housed in said fourth section with said top surface partially resting against said third step.

15. The automatic flow regulator valve set forth in claim 14, further characterized in that said first and second central cavities are connected, said first central cavity is smaller in diameter than said second central cavity and said second neck is disposed between said first and second central cavities.

16. The automatic flow regulator valve set forth in claim 15, further characterized in that said first central cavity has a cooperative shape and dimension to receive said spring therein.

17. The automatic flow regulator valve set forth in claim 3, further characterized in that said spring is housed inside said body, said body is housed within said third section and said base is housed within said fourth section, said piston assembly is positioned within said second and third sections, with said first neck partially housed within said body, said bolt is inserted through said first base into said body with said shank and said threaded portion being housed within said body and said head being kept at said base, said threaded portion is mounted into said piston assembly, said outlet member is mounted into said interior threaded section, and said locking ring is mounted into said first section, said exterior threaded section is removable mounted to a liquid source outlet.

18. The automatic flow regulator valve set forth in claim 17, further characterized in that said liquid source outlet is a water outlet.

* * * * *